United States Patent [19]

Carpenter, Jr.

[11] Patent Number: 5,073,678

[45] Date of Patent: Dec. 17, 1991

[54] SPLINE BALL TERMINAL (SBT)

[75] Inventor: Roy B. Carpenter, Jr., Boulder, Colo.

[73] Assignee: Lightning Eliminators & Consultants, Inc., Boulder, Colo.

[21] Appl. No.: 570,626

[22] Filed: Aug. 21, 1990

[51] Int. Cl.$^5$ ............................................. H02G 13/00
[52] U.S. Cl. ........................................... 174/2; 174/3; 174/4 R
[58] Field of Search ................ 174/2, 3, 4 R; 361/117, 361/215, 216, 218, 220, 221, 222; 343/885, 899

[56] References Cited

U.S. PATENT DOCUMENTS

| | | | |
|---|---|---|---|
| 1,096 | 3/1839 | Barber | 174/4 R |
| 1,193,848 | 8/1916 | Van Horn | 174/4 R X |
| 1,757,172 | 5/1930 | Cazel et al. | 174/4 R X |
| 3,120,625 | 2/1964 | Smith | 361/218 |
| 4,180,698 | 12/1979 | Carpenter, Jr. | 174/2 |
| 4,605,814 | 8/1986 | Gillem | 174/2 |
| 4,910,636 | 3/1990 | Sadler et al. | 174/4 R X |

FOREIGN PATENT DOCUMENTS

| | | | |
|---|---|---|---|
| 552372 | 1/1923 | France | 174/4 R |
| 1015590 | 8/1952 | France | 361/218 |
| 262841 | 2/1929 | Italy | 174/3 |
| 284311 | 4/1931 | Italy | 174/4 R |
| 296647 | 9/1928 | United Kingdom | 174/3 |
| 481242 | 3/1939 | United Kingdom | 343/899 |

OTHER PUBLICATIONS

Catalog:*Thompson's Lightning Protection Special Equipment*, Thompson Lightning Protection, Inc., St. Paul, Minn., copyright 1967, pp. 9 and 11, copy in 174-3.
UL96, *Standard for Safety, Lightning Protection Components*, 12-88.

Primary Examiner—Laramie E. Askin

[57] ABSTRACT

Underwriters Laboratories lists lightning protection components as described in their UL 96, Third Edition Publication. The present invention improves on the basic lightning rod systems. The improvement provides a multiplicity of points extending in all directions from the top of a supporting rod which is designed to fit the conventional lightning rod mounting bases. The points are separated and configured to produce maximum ionization current commensurate and configured to carry an above average lightning strike current flow. The result is a hybrid lightning air terminal and lightning prevention system module named the Spline Ball Terminal (SBT). The SBT partially equalizes the charge differential between the protected site and the cloud thereby preventing many strokes from occurring. If a high energy stroke does enter the protected zone, then the SBT acts like a traditional UL approved lightning rod, but with much greater efficiency. The SBT is the only UL listed hybrid lightning dissipation and lightning rod system that can satisfy both design criteria.

4 Claims, 6 Drawing Sheets

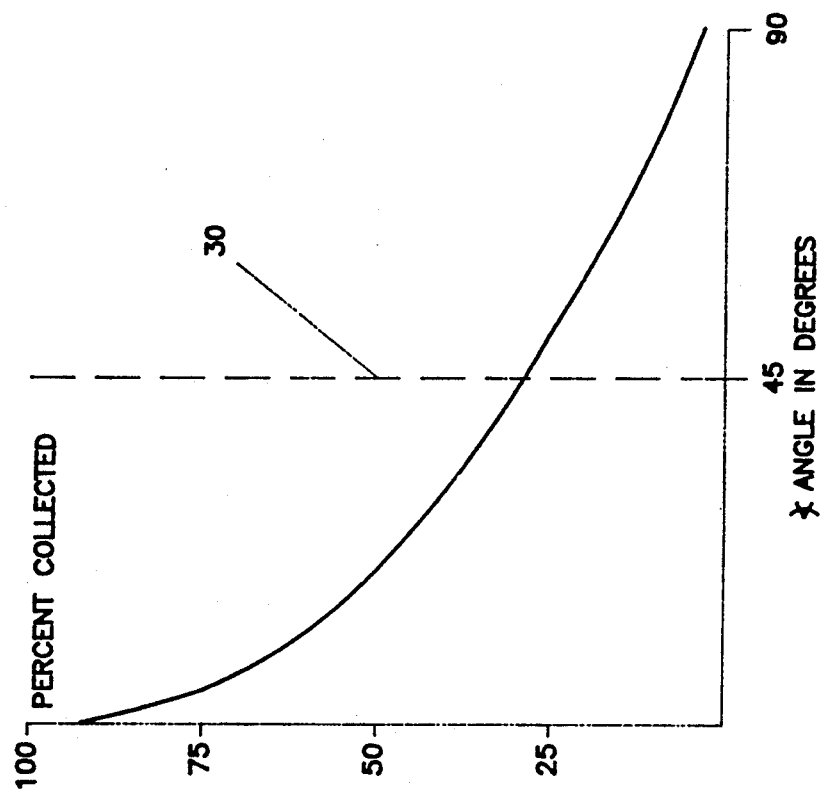
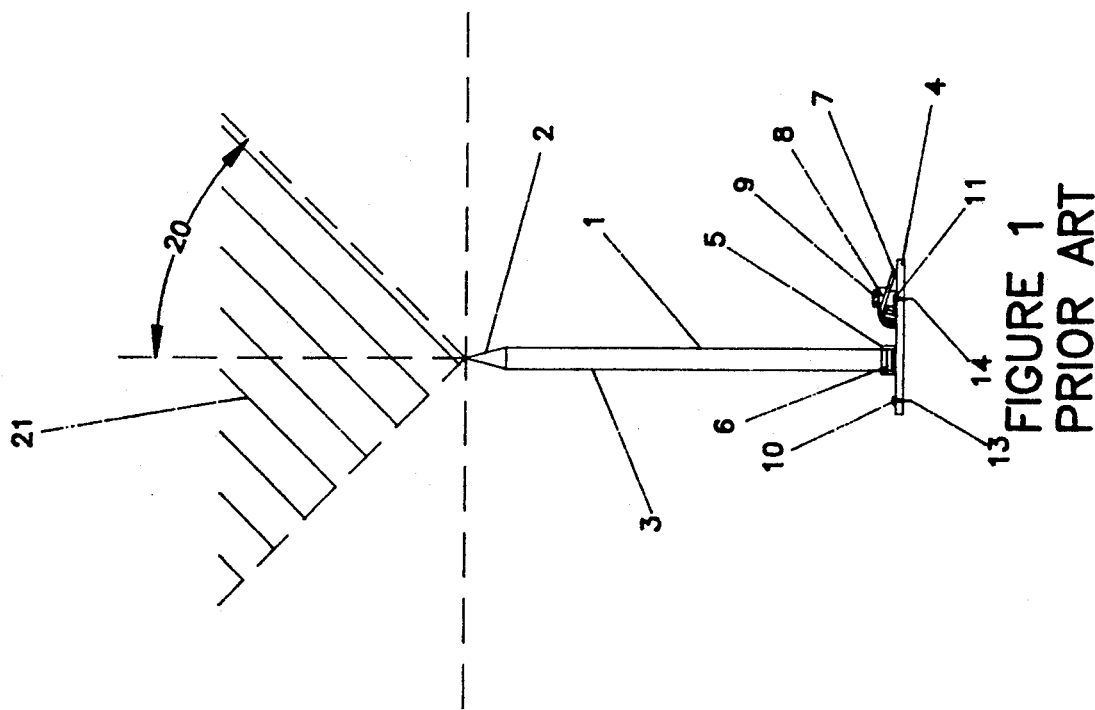
FIGURE 2
FIGURE 1
PRIOR ART

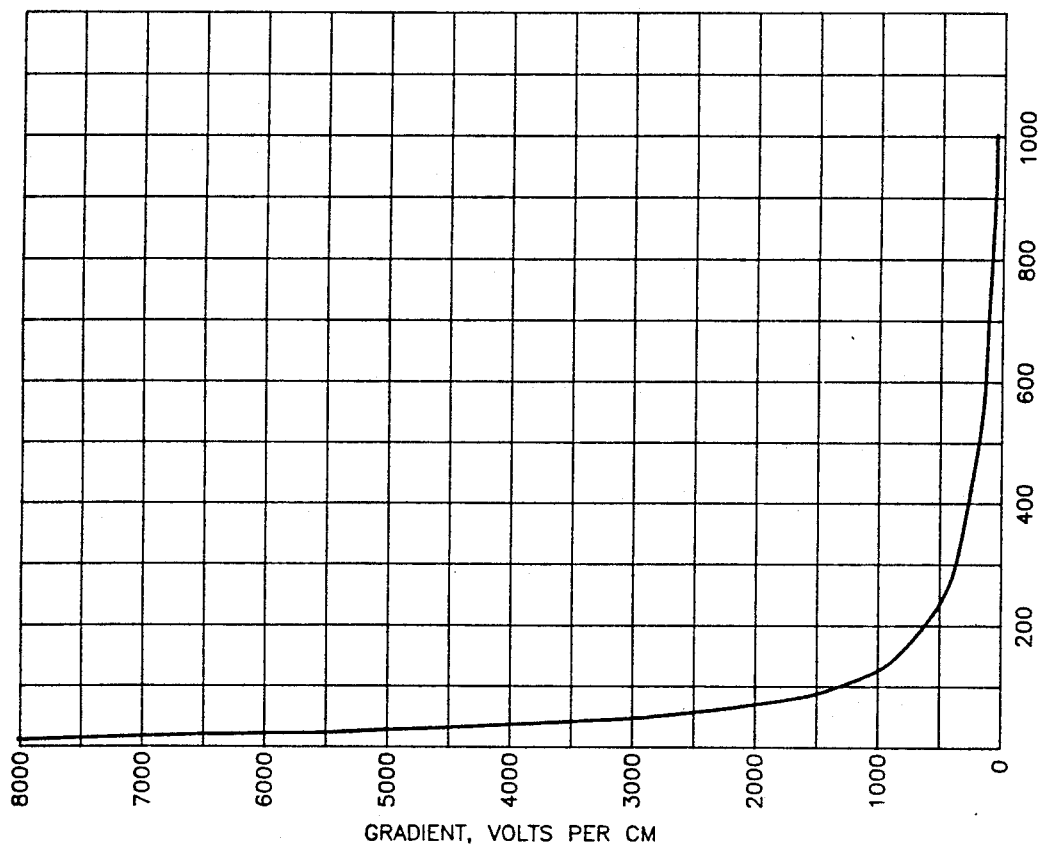

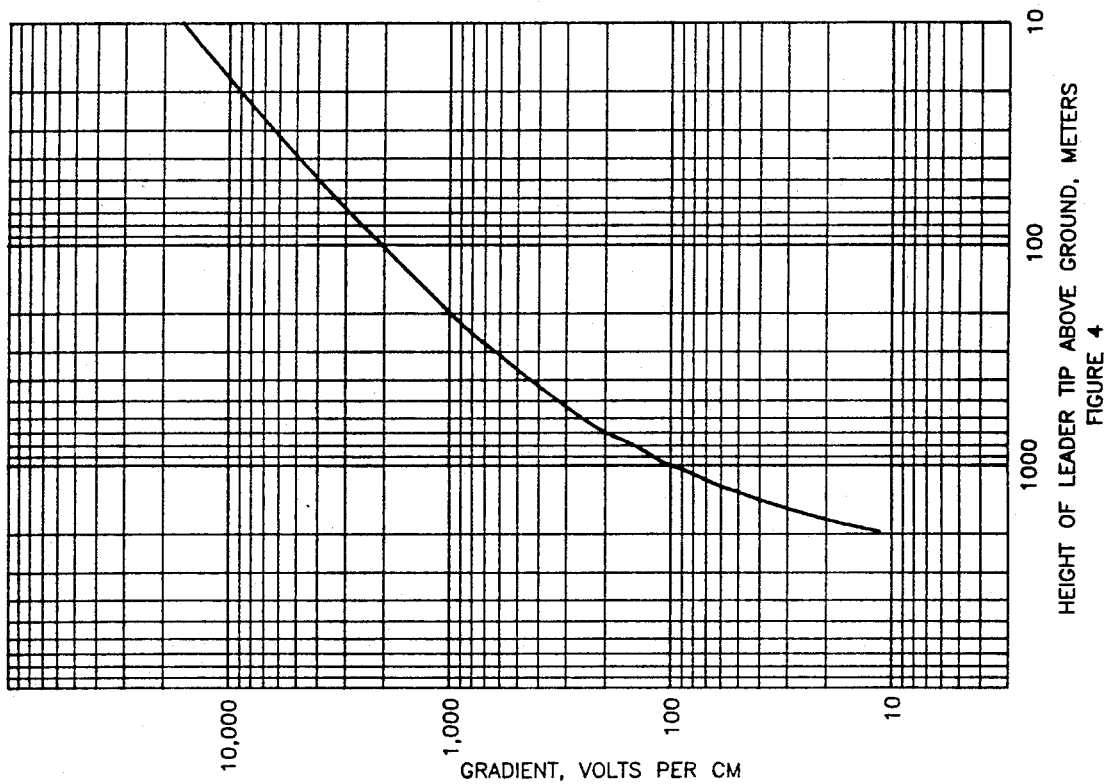

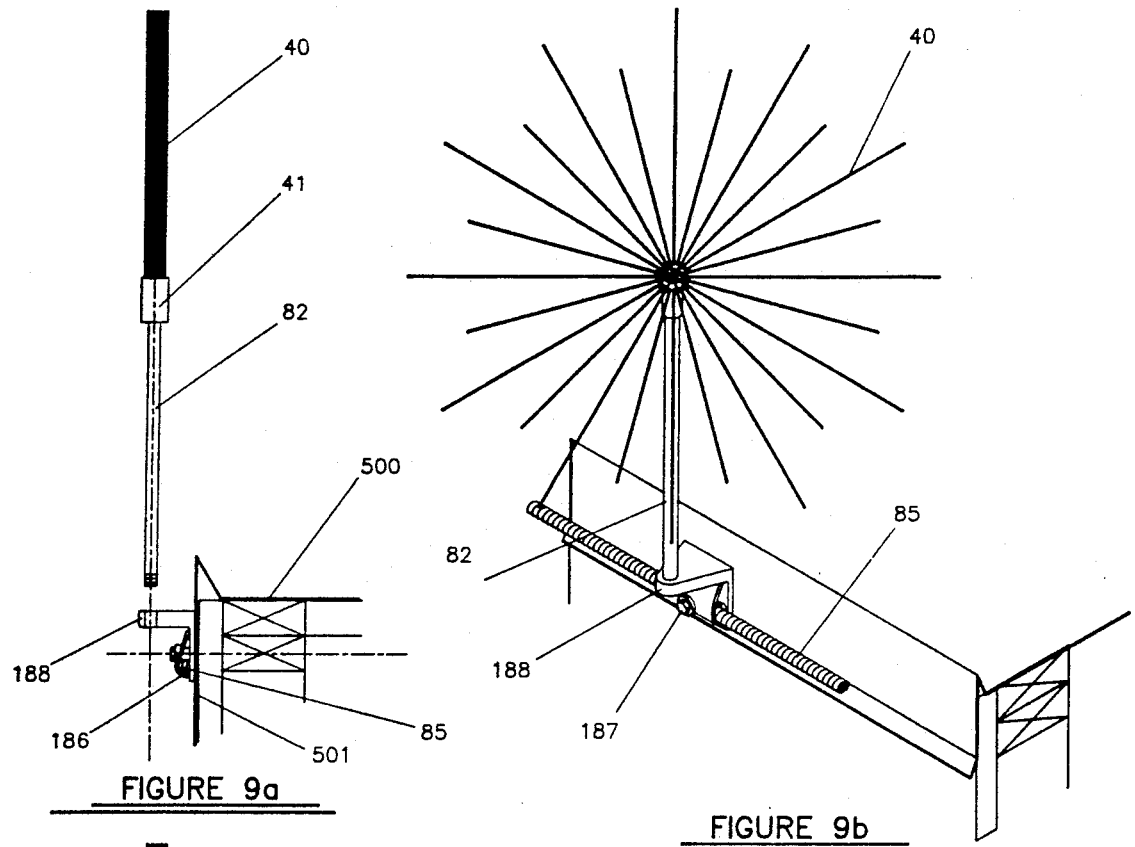
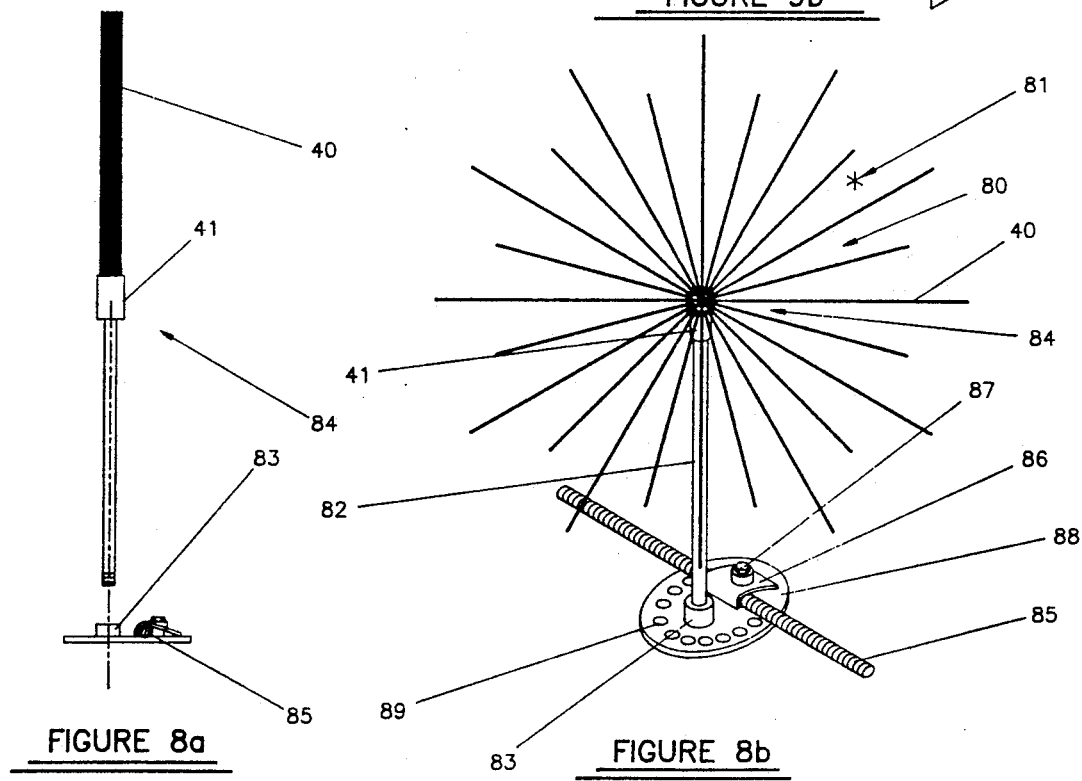

SPLINE BALL TERMINAL (SBT)

FIELD OF INVENTION

The present invention relates to a hybrid lightning prevention and lightning rod system.

BACKGROUND

Three basic methods are known to protect a facility from lightning strokes:
1) Prevent the stroke by discharging the cloud induced charge on the earth's surface.
2) Isolating a site by creating a space charge of the opposite polarity thereby preventing the stroke.
3) Wait for the stroke, and bypass the stroke current through a lightning rod into the earth.

The most advanced stroke prevention system is described in Carpenter's U.S. Pat. No. 4,180,698 issued Dec. 25, 1979. Thousands of ionizer points are suspended over the protected facility. These points are grounded to an underground current collector which surrounds the protected facility. The site or facility is discharged before the stroke occurs.

The most widely accepted lightning rod configurations are described in Underwriters Laboratories, *Standard for Lightning Protection Components:* UL 96, Third Edition and NFPA Standard 78. Tubular metal air terminals are described having terminal base supports which are connected to a common ground wire.

The air terminals described in UL 96 do not offer any stroke prevention capabilities and are limited in their collecting capability to no better than plus or minus 45 degrees. They merely bypass the stroke down a preferred path and minimize the damage. They are, however, relatively inexpensive and easy to install. What has been needed in the marketplace is an inexpensive UL approved lightning terminal which gives the resulting assembly a reasonable level of lightning prevention capability and a more effective collection capability. The present invention addresses those needs.

SUMMARY OF THE INVENTION

The main object of the present invention is to provide a UL approved hybrid lightning terminal and lightning prevention system.

Another object of the present invention is to more effectively collect strokes approaching from any angle.

Another object of the present invention is to effectively discharge a site by offering an adequate number of ionization points mounted in place of a UL approved lightning rod.

Other objects of this invention will appear from the following description and appended claims, reference being had to the accompanying drawings forming a part of this application wherein like reference characters designate corresponding parts in the several views.

BRIEF DESCRIPTION OF THE DRAWINGS

FIG. 1 is a front elevational view of a standard UL approved lightning rod.

FIG. 2 is a graph showing the relationship between the lightning stroke angle of attack and efficiency of stroke collection.

FIG. 3 is a graph showing the voltage gradient relationship between lightning stroke leader as a function of horizontal distance to any object.

FIG. 4 is a graph showing the voltage gradient relationship between the lightning stroke leader as a function of height above ground.

FIG. 8(a) is a front elevational view of a spline ball terminal (SBT) before the splines are arrayed into their functional positions.

FIG. 8(b) is a perspective view of an SBT showing the common ground connector.

FIG. 9(a) is a front elevational view of a side mounted SBT with the splines in the shipping position.

FIG. 9(b) is a top perspective view of a side mounted SBT with the splines in a functional position.

Figure 6:
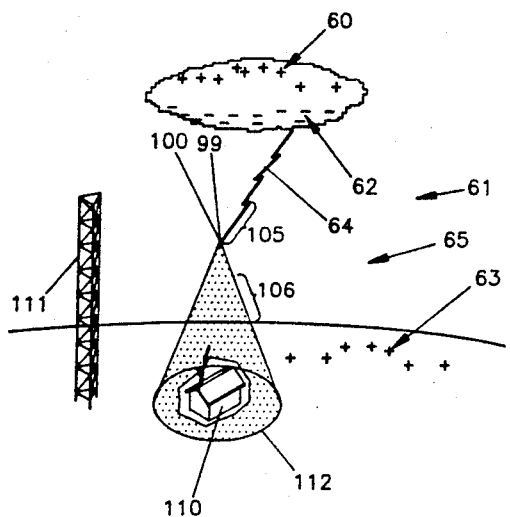
FIG. 6 is a perspective view of a protected facility and a thundercloud.

Before explaining the disclosed embodiments of the present invention in detail, it is to be understood that the invention is not limited in its application to the details of the particular arrangement shown, since the invention is capable of many other embodiments. Also, the terminology used herein is for the purpose of description and not of limitation.

DETAILED DESCRIPTION

Referring first to FIG. 1, a UL approved lightning rod 1 is shown. A tubular air terminal shaft 3 has a tip 2 and a threaded bottom portion 6. The base 4 has a threaded hub 5 which receives the bottom portion 6 of the air terminal shaft 3. The base 4 has mounting holes 10 and 11 with screws 13 and 14. The base 4 has a connector fitting 7 for connection to the lightning conductor 8. Lightning conductor 8 is a cable. A bolt 9 tightens the connector fitting against the lightning conductor 8. The lightning conductor contacts the base 4 for not less than 1 ½ inches on all sides of the cable.

The threaded hub 5 has a minimum wall thickness of 1/16 inch measured at the base of the threads. The air terminal shaft 3 is at least 10 inches long and is made of either copper, copper alloy, or aluminum.

The lightning collecting volume assumed by the industry is as described by the cone 21. The angle 20 is 45 degrees around the vertical centerline of the air terminal shaft 3 for a full 360 degrees in azimuth.

FIG. 2 shows how the actual lightning stroke percent collected varies with the angle 20 of FIG. 1. Directly vertical strokes are collected at a rate approaching 100%. Horizontal strokes are just not collected by the conventional lightning rod in FIG. 1. Industry standards use the theoretical efficiency of 45 degrees shown by line 30 in FIG. 2. Thus a cone of protection 21 of 45 degrees is traditionally assigned to the lightning rod of FIG. 1.

A discussion of the dynamics of a lightning stroke shows how the present invention increases the cone of protection to a near 100% efficiency even at angles in excess of 90 degrees. Refer to FIG. 6.

Lightning is the result of charge accumulations within a cloud 60 that exceeds the dielectric strength of air. The air 61 beneath the cloud 60 can no longer act as an insulator. While the charge 62 is being generated, the resulting electrostatic field is inducing a charge on the earth surface beneath it of equal but opposite potential at 63. It is much like an electrical shadow that moves with the cloud. When the potential 62 within the cloud base reaches approximately $10^8$ volts, leaders form and move toward earth in "steps" 64. At that time the electric field 65 beneath the cloud 60 will average about 20 Kv per meter of elevation above the earth.

The step leaders 64 move toward earth at velocities between $1 \times 10^5$ and $3 \times 10^6$ meters per second. As these step leaders 64 approach earth, the electric field near that leader rises rapidly as illustrated by FIG. 4.

Figures 5A, 5B, 5C:
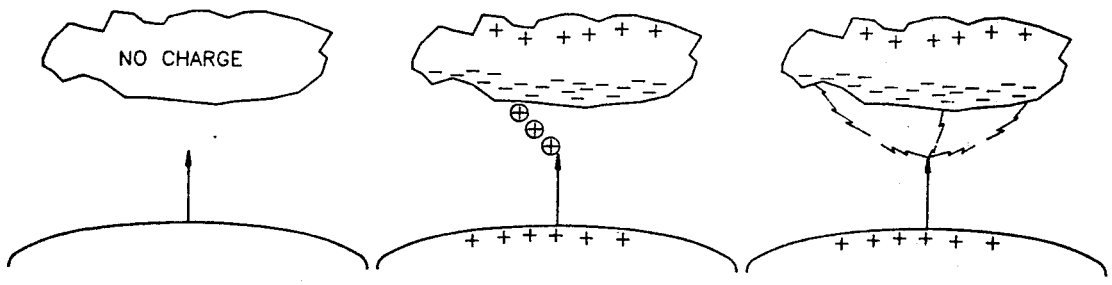
FIG. 5a, 5b, 5c, 5d, 5e and 5f are sketches and graphs showing the relationships between lightning cloud buildup and electrical power.
Figure 5D:
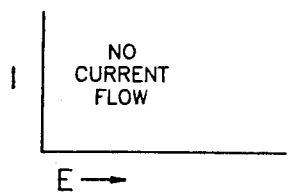
Figure 5E:
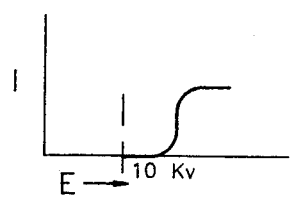
Figure 5F:
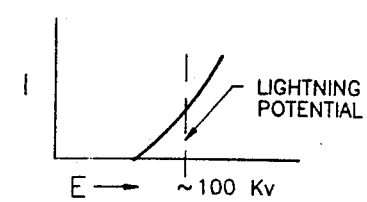

FIG. 3 presents the electric field gradient as a function of distances from the leader 64 while FIG. 4 presents the electric field gradient between the leader tip 99 of FIG. 6 and earth. From these data, it is evident that as the step leader 64 approaches earth, the voltage between that leader and an earthbound facility 110 rises to very high potentials. In a matter of a few milliseconds, the electrostatic voltage on a pointed rod elevated above earth by a mere 10 meters will rise from one hundred thousand volts to over a million volts. This potential will cause the pointed air terminal to first break into corona, and if the resulting electrostatic field is approximately perpendicular, the leader then rapidly breaks into streams as illustrated by FIGS. 5a–5c which also illustrate the three phases a point will pass through in an electrostatic field.

The primary question is "where will that step leader terminate?" To that end, a great deal of research has been accomplished and recorded. It seems that the stroke termination is a function of two definable factors in addition to random chance.

Refer to FIG. 6. Random chance determines the path the leader 64 will take until that leader reaches the "point of discrimination" 100.

The point of discrimination 100 is that point in the leader descent path where the strike point is determined. It is the beginning point of the last step or about one full step from earth. This distance is also referred to as the "striking distance" 106.

The striking distance 106 is the length of the path between the point of discrimination 100 and any potential stroke terminus. It may also be considered the maximum distance between the tip of the leader and the terminus. The striking distance 106 and the step length 105 are approximately the same value. Both are a statistical quantity dependent on the intensity of the ensuing lightning stroke current.

Figure 7:
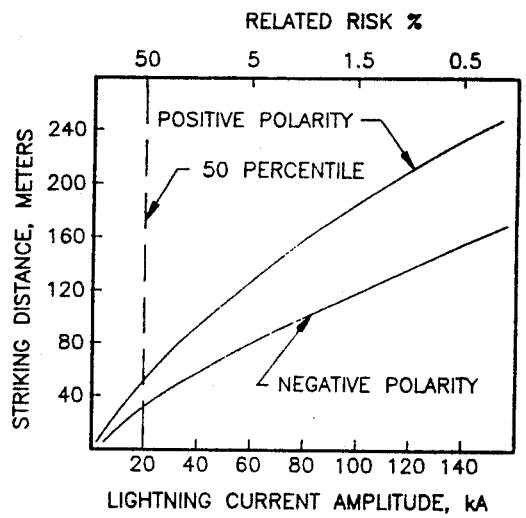
FIG. 7 is a graph showing the relationship between striking distances and stroke current amplitude.

These values are plotted on FIG. 7. Note that these steps and the striking distances vary from a low of approximately 10 meters to a high in excess of 200 meters. However, the average is only about 20 meters for a negative stroke—the most common. For a positive stroke, it exceeds 45 meters.

Placing these data in perspective, we know that after the leader reaches the point of discrimination as in FIG. 6, the strike point has been determined. Before that time the path is random and irrelevant. Therefore, only the facility 110 within the strike zone 112 is at risk. A tall tower 111 can be just outside, but not struck. A blade of grass within the strike zone 112 will be struck if it is the only alternative within the strike zone.

The one possible exception to this rule is very important to this analysis. That exception is when the leader channel passes close to a high structure with points or sharp discontinuities. Close proximity of the high electric field can cause the potential to rise high enough (refer to FIG. 3) to stimulate that point to pass into the streamer mode. That streamer may then "reach out" and collect that leader (not illustrated). Sharp changes in the leader path, even 90 degree turns, can occur and has been recorded on film.

Conventional collectors or air terminals are devices deployed to intercept an incoming step leader and divert the related energy of earth by some preferred path. The lightning rod of FIG. 1 is typical of air terminals used for this function, and the most widely used.

FIGS. 8a and 8b and 9a and 9b show the Spline Ball Terminal (SBT) 80. The SBT has a number of splines 40 centrally affixed at point 41. The ideal number of splines is one hundred five (105). Each spline must be at least 1/10 inch in diameter or greater in order to withstand the electric power of an average stroke. See FIG. 4. A spline 40 is oriented at least every 5 degrees (as shown by angle 81) in azimuth for the full 360 degrees and a full 120 degrees in elevation. As a result, there is no direction from which a leader can approach that would not have a collective point oriented directly toward it with many nearby backup points. Therefore, the cone of protection 21 in FIG. 1 is extended to where angle 20 is extended to over 120 degrees. Yet the percent collected approaches 100 percent from all angles because each spline 40 offers a near zero angle of attack on the lightning stroke.

Each spline 40 is at least 12 inches long. The shaft 82 is at least 10 inches long. The threaded hub 83 has a minimum wall thickness of 1/16 inch measured at the base of the threads. The spline dissipation unit 84 holds the splines 40 together in a common electrical bond.

The base 88 supports the threaded hub 83. Mounting holes 89 are used to firmly attach the SBT to the protected facility. A ground cable 85 passes through the connector fitting 86 for a length of at least 1 ½ inches surrounded on all sides by the connector fitting 86. A bolt 87 secures the ground cable 85 to the connector fitting 86.

FIGS. 9a and 9b merely show a different base 188 for side mounting on a wall 501 on a protected facility 500. Bolt 187 fastens the ground cable 85 in the connector fitting 186.

Figure 10:
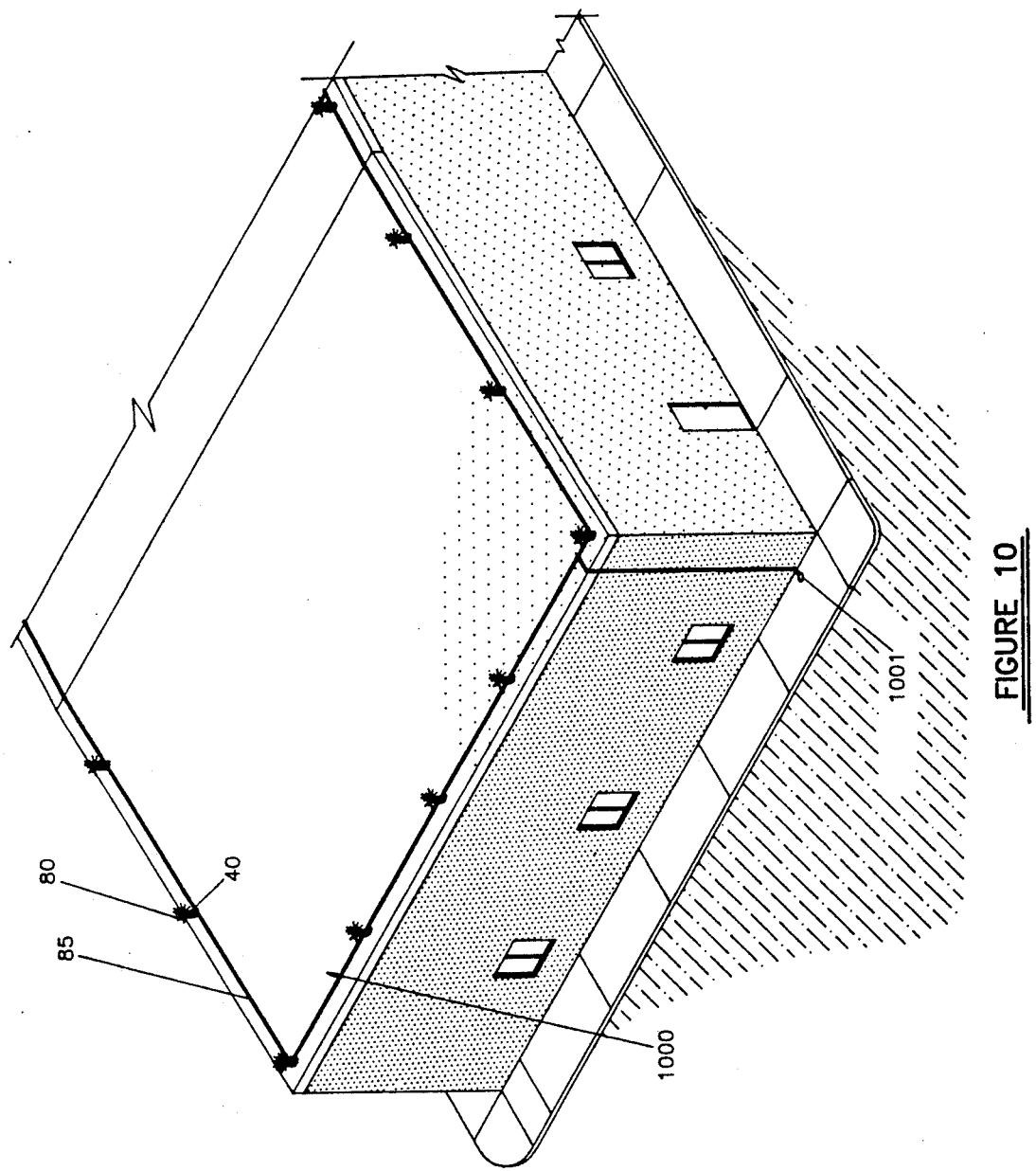
FIG. 10 is a perspective view of a protected facility having a network of interconnected SBT's, deployed to satisfy the existing standards.

FIG. 10 shows a series of SBT's 80 mounted atop the roof of a protected facility 1000. A ground cable 85 connects all the SBT's to a common ground 1001. The net effect of multiple SBT's is to create a number of ionization points 40 over the protected facility. A full description of how these points dissipate the cloud to earth charge is found in U.S. Pat. No. ,180,698 to Carpenter and the Dissipation Array System described in Carpenter's pending U.S. patent application, Ser. No. 07/327,531. The more the SBT's the better the chance of preventing all potential strokes to the protected facility 1000. The more the ionization points 40 the faster the dissipation of the induced charge and the better the chance of stroke prevention.

The spacing between SBT's on a flat roof to provide dissipation and stroke collection capabilities shall be twenty to twenty-five feet. Furthermore, there shall be a 50 foot maximum distance between SBT's anywhere on the roof. Therefore, large roofs shall require multiple strings of SBT's.

Thus, the SBT is a hybrid stroke prevention system with highly efficient lightning rod collection capabilities. The SBT meets UL standards for lightning rods or air terminals.

I claim:

1. An improvement to a lightning rod mounted atop a protected facility. wherein the lightning rod comprises a tubular metal vertical shaft of at least 10 inches in length, a threaded mounting collar for the shaft, a base supporting the threaded mounting collar and the shaft; the base further comprising mounting holes, a connector fitting having at least a 1 ½ inch connection with the entire circumference of a ground conductor cable; the ground conductor cable having an earth ground connection; wherein the improvement comprises:

a spline assembly mounted atop the vertical shaft;
   said spline assembly further
   comprising individual splines centrally connected to a common electrical bond and outwardly pointing therefrom;
   said splines oriented at least every 5 degrees in azimuth for a full 360 degrees horizontally and a full 120 degrees in elevation;
   said splines having a length of at least 12 inches and a diameter large enough to carry a current well in excess of the average strike; and
   said splines each having a tip which acts as a collector point for lightning strokes and an ionizer point for discharging ambient electrical charges;
   thereby providing a near vertical attack angle to a collector for any lightning stroke approaching from either a vertical or horizontal direction.

2. The improved lightning rod of claim 1 further comprising,
   multiples thereof connected in a serial manner to the ground conductor cable,
   thereby providing a hybrid lightning stroke prevention system and lightning rod by supplying adequate ionization points over the protected facility, thereby rapidly discharging ambient electrical charges and preventing lightning strokes from striking the protected facility.

3. The improved lightning rod of claim 2 further comprising, a separation spacing between each lightning rod of no more than 50 feet.

4. A lightning protection system comprising:
   at least two spline assemblies each mounted atop a verticle shaft;
   each vertical shaft having a length of at least 10 inches;
   each vertical shaft having a base;
   said bases having a separation distance of no more than 50 feet;
   said bases having a common ground cable for all vertical shafts; and
   said spline assemblies having approximately 100 splines of at least 1/10 inch diameter outwardly projecting at least every 5 degrees in azimuth for a full 360 degrees horizontally and a full 120 degrees in elevation;
   thereby efficiently collecting and preventing lightning strokes.

* * * * *